(12) United States Patent
Chaney et al.

(10) Patent No.: US 9,144,200 B2
(45) Date of Patent: Sep. 29, 2015

(54) PITCHED PROFILE PRE-CUTTER TINE

(71) Applicant: Deere & Company, Moline, IL (US)

(72) Inventors: Nathan A. Chaney, Ottumwa, IA (US); Walter M. Schlesser, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/149,850

(22) Filed: Jan. 8, 2014

(65) Prior Publication Data

US 2015/0189835 A1 Jul. 9, 2015

(51) Int. Cl.
*A01D 39/00* (2006.01)
*A01D 43/02* (2006.01)
*A01D 75/00* (2006.01)
*A01F 15/10* (2006.01)

(52) U.S. Cl.
CPC ...................................... *A01F 15/10* (2013.01)

(58) Field of Classification Search
CPC . A01F 2015/108; A01F 15/106; A01F 15/10; A01F 25/183; A01F 12/40; A01F 29/02; A01D 90/04; A01D 90/06; A01D 41/1243; A01D 89/008
USPC .............. 460/112, 111, 113, 119, 73; 56/341, 56/504, 295, 14.5; 100/144, 97; 241/194, 241/101.762, 221
See application file for complete search history.

(56) References Cited

U.S. PATENT DOCUMENTS

| | | | |
|---|---|---|---|
| 2,841,946 A * | 7/1958 | Sutherland et al. .............. | 56/289 |
| 3,084,493 A * | 4/1963 | Kucera ............................. | 56/294 |
| 4,027,826 A * | 6/1977 | Grimm et al. ................. | 241/221 |
| 4,351,144 A * | 9/1982 | Benenati ......................... | 56/295 |
| 4,907,503 A * | 3/1990 | Ryan ................................ | 100/65 |
| 5,544,826 A * | 8/1996 | Klingler et al. ................ | 241/242 |
| 5,769,711 A * | 6/1998 | Roberg ............................ | 460/73 |
| 6,494,270 B1 * | 12/2002 | Lawson ......................... | 172/554 |
| 6,595,123 B2 * | 7/2003 | Schrag et al. .................... | 100/97 |
| 6,679,041 B2 * | 1/2004 | Viaud et al. ...................... | 56/341 |
| 6,769,239 B1 * | 8/2004 | Webb ............................... | 56/341 |
| 6,820,735 B1 * | 11/2004 | Cullen ........................... | 198/677 |
| 6,886,312 B1 * | 5/2005 | Inman et al. ..................... | 53/527 |
| 6,893,340 B1 * | 5/2005 | Schmidt et al. ............... | 460/111 |
| 6,953,086 B2 * | 10/2005 | Simpson ........................ | 166/104 |
| 6,953,398 B1 * | 10/2005 | Turner .......................... | 460/112 |
| 7,124,568 B2 * | 10/2006 | Hotaling .......................... | 56/341 |
| 7,694,504 B1 * | 4/2010 | Viaud et al. ...................... | 56/341 |

(Continued)

FOREIGN PATENT DOCUMENTS

| | | | |
|---|---|---|---|
| DE | 19541561 A1 | 5/1997 | |
| DE | 202013102470 U1 * | 8/2013 | .............. F04D 29/28 |

OTHER PUBLICATIONS

European Search Report issued in counterpart application No. 14198562.2, dated Jun. 8, 2015 (5 pages).

*Primary Examiner* — Arpád Fábián-Kovács

(57) ABSTRACT

A pre-cutter tine has a relatively wide working face which is pitched or canted relative to a plane extending vertically to an axis of rotation of a pre-cutter rotor carrying a plurality of the tines arranged helically about the axis. The pitched working face of adjacent tines acts to support the crop being cut as the pitched working faces advance the crop toward the pre-cutter knives which are spaced such that the working faces of adjacent tines pass on opposite sides of a given knife. The working faces of the tines may be pitched such as to cause the engaged crop to be conveyed inwardly as well as to the rear by the tines.

7 Claims, 4 Drawing Sheets

(56) References Cited

U.S. PATENT DOCUMENTS

| | | |
|---|---|---|
| 7,716,910 B2 * | 5/2010 | Woodford ........................ 56/364 |
| 7,867,072 B2 * | 1/2011 | Lauwers et al. .............. 460/112 |
| 8,205,424 B1 | 6/2012 | Lang et al. |
| 2002/0066263 A1 * | 6/2002 | Megli ............................. 56/295 |
| 2002/0074436 A1 * | 6/2002 | Hruska ........................ 241/194 |
| 2002/0107056 A1 * | 8/2002 | VanEe ........................... 460/112 |
| 2003/0125098 A1 * | 7/2003 | Weichholdt ................... 460/112 |
| 2005/0097868 A1 | 5/2005 | Inman et al. |
| 2008/0188275 A1 * | 8/2008 | Mayerle et al. ............... 460/111 |
| 2009/0223193 A1 * | 9/2009 | Funnell ........................... 56/17.5 |
| 2012/0304612 A1 * | 12/2012 | Roberge ........................... 56/341 |
| 2013/0111871 A1 * | 5/2013 | Hinds ............................. 56/500 |
| 2013/0167497 A1 * | 7/2013 | Van De Weijer et al. ....... 56/341 |

\* cited by examiner

PITCHED PROFILE PRE-CUTTER TINE

FIELD OF THE INVENTION

The present invention relates to crop feeding rotors and more particularly relates to tines of such feeding rotors.

BACKGROUND OF THE INVENTION

A typical crop feeding rotor includes a plurality of tines formed of plates having a plurality of equi-angularly spaced points are welded to a central rotor tube to form a complete crop feeding rotor. In a pre-cutter, associated with a baler crop pick-up arrangement, for example, the tines are welded on the rotor to produce a desired spiral pattern. In some prior art crop feeding rotors, the plates are constructed of sheet metal with adjacent pairs of the plates of the spiral pattern occupying the same angular position about the axis of the rotor. In other prior art rotors, at least leading crop engaging surfaces of the points of the tines of the rotors are constructed to have a wide profile having a width approximately three times that of the plate, e.g., see the tines disclosed in U.S. Pat. No. 8,205,424. The wide profile tine points have the advantages over the points of the like-positioned pairs of sheet metal tines of being more durable and easier to manufacture. However, when welded on the rotor to produce the required spiral pattern, the wide profile tine creates an uneven or staggered surface for crop to engage when pressed against the stationary cutting knife thus resulting in a diminished cut quality when compared to the much narrower points of the sheet metal tines since the narrow profile allows a pair of tines to straddle each stationary knife.

What is needed then is a pre-cutter tine having points including a wide-profile crop engaging surface that is durable, but does not present the undesirable uneven or staggered surface for crop to engage.

SUMMARY OF THE INVENTION

According to one aspect of the present invention, as set forth in claim 1, there is provided an improved pre-cutter tine assembly provided with a plurality of points, each having a leading wide-profile crop-engaging surface that is angled relative to a vertical plane disposed at a right angle to an axis of rotation of the tine assembly.

In another aspect of the invention, a plurality of the tine assemblies are symmetrically arranged on opposite sides of a central vertical plane passing through the crop feed rotor, with the tine assemblies on opposite sides of the plane being pitched in an opposite direction and oriented such that crop on opposite sides of the plane is directed toward the plane.

These and other objects of the invention will become apparent from a reading of the ensuing description together with the appended drawings.

DESCRIPTION OF THE PREFERRED EMBODIMENT

Figure 1:
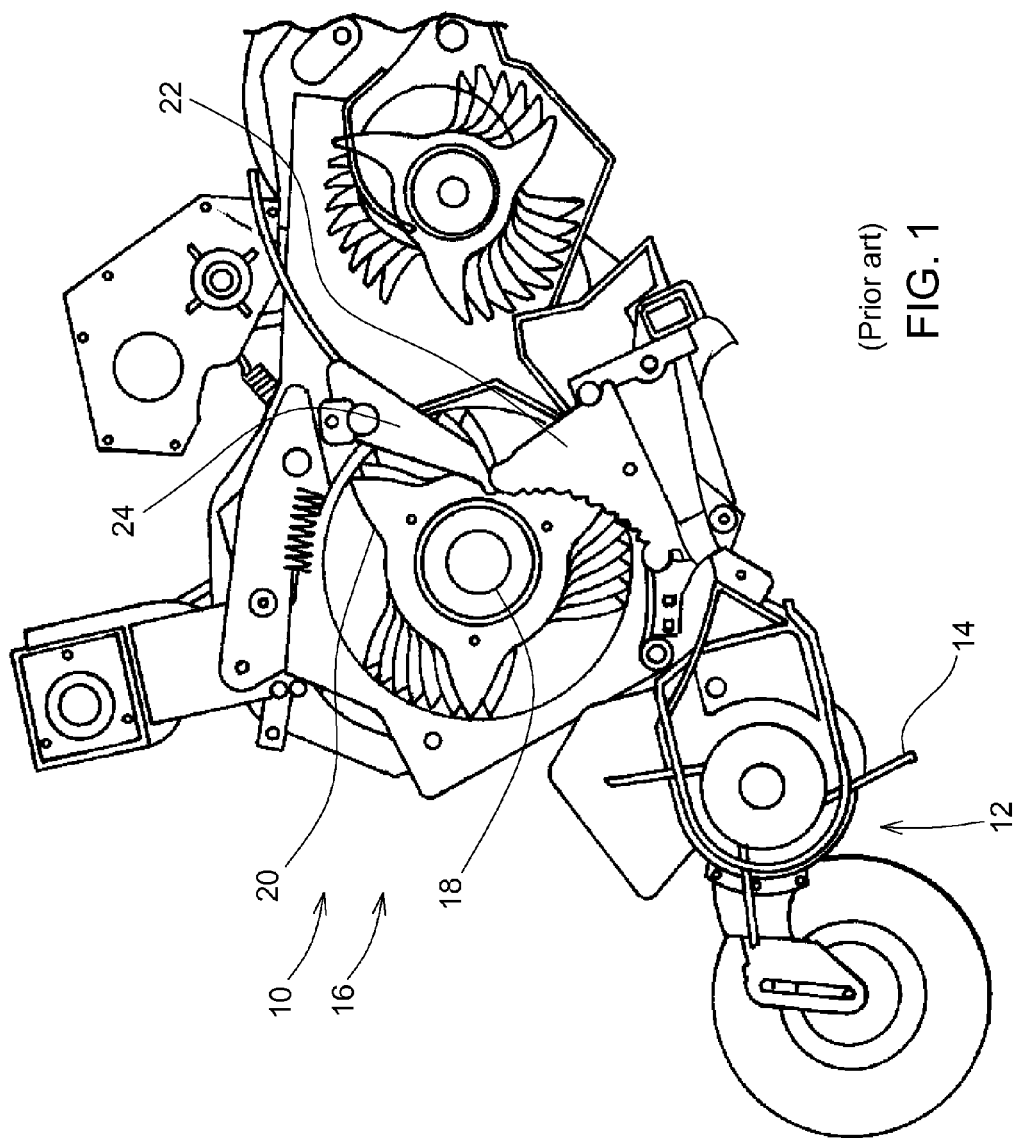
FIG. 1 is a vertical sectional view, looking toward the right, taken crosswise to the direction of travel through a conventional crop material pickup equipped with a pre-cutter assembly and crop feed rotor.

Referring now to FIG. 1, there is shown a conventional crop material pick-up 10 carried at the front of an agricultural implement, not further shown, such as a baler, for example, for processing gathered crop. The pick-up 10 includes a pick-up rotor 12 equipped with spring wire tines 14 that engage and elevate a windrow of crop material (not shown) lying on the ground, and convey the crop material to the rear for further processing by a pre-cutter arrangement 16. The pre-cutter arrangement 16 comprises a transverse pre-cutter rotor 18 carrying a plurality of identical, laterally spaced rotor tines 20, disposed in interleaved relationship both to a plurality of transversely spaced, retractable pre-cutter knives 22, and to a plurality of transversely spaced crop stripper members 24.

Figure 2:
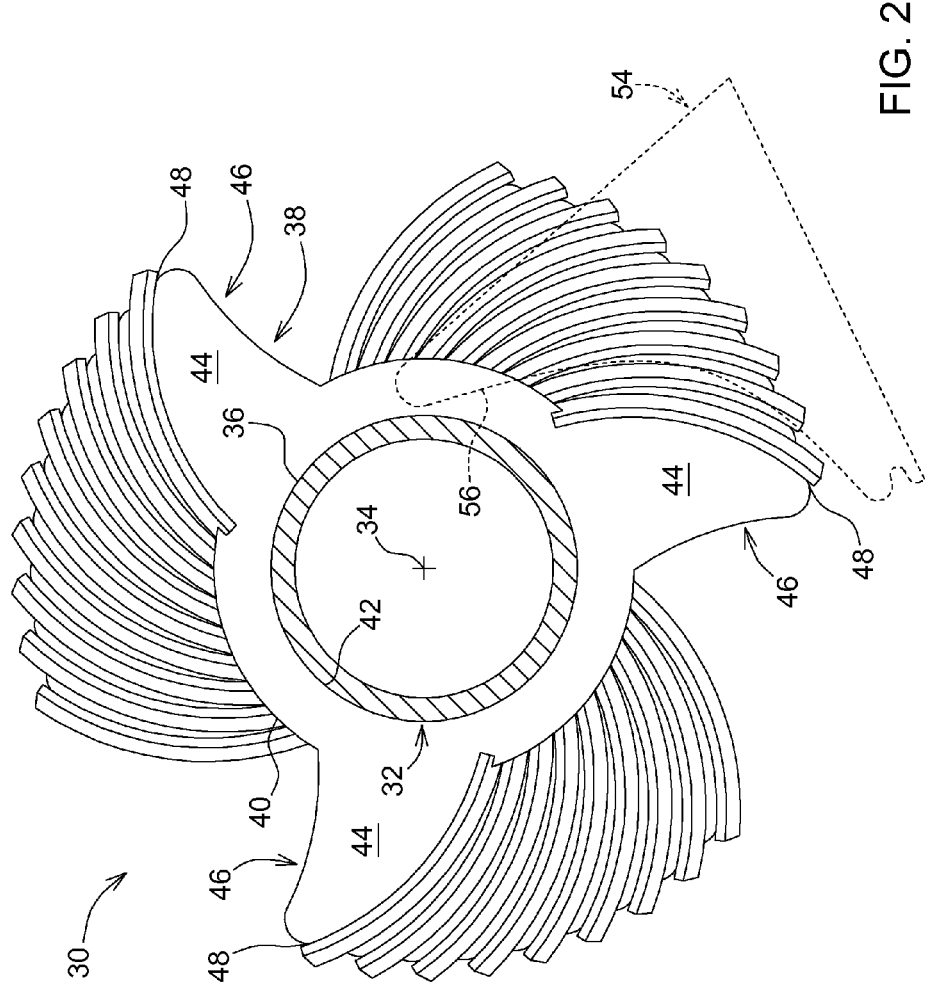
FIG. 2 is a left side view of a pre-cutter rotor embodying tine assemblies including points having leading working faces constructed in accordance with the principles of the present invention, and with a schematic representation of a pre-cutter knife being shown by dashed lines in a working position.

Referring now to FIG. 2 there is shown a pre-cutter rotor 30 comprising a cylindrical tubular core 32 having a central rotation axis 34 and having an outer cylindrical surface 36 on which a plurality of identical rotor tines 38 are fixed at respective locations spaced equally from each other along the length of the core 32.

Figure 3:
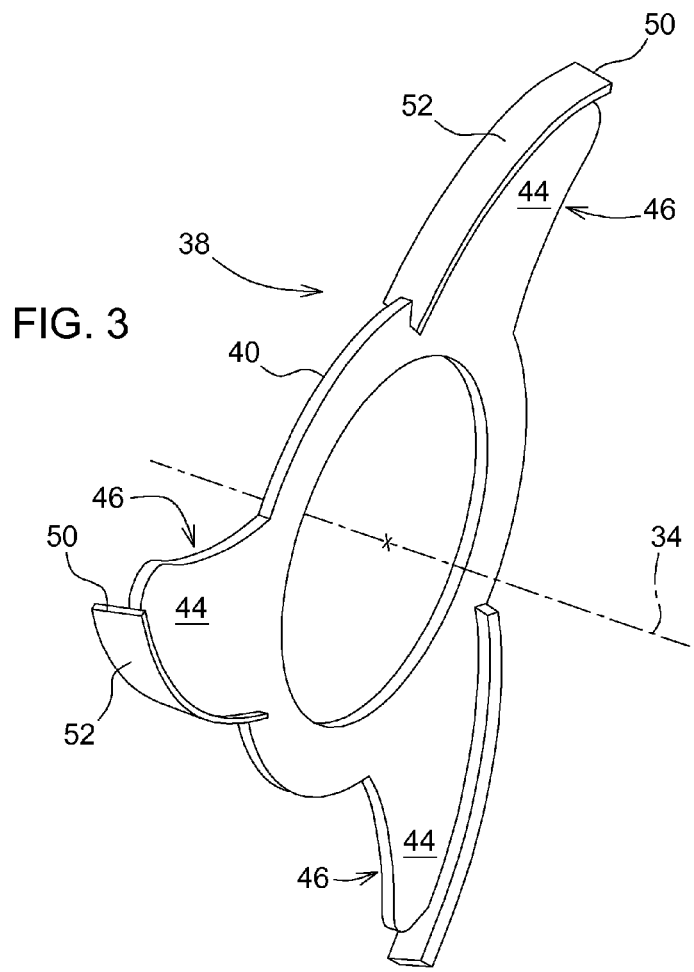
FIG. 3 is a perspective view showing one of the tine assemblies of FIG. 2.

While the tines 38 can take various forms without departing from the principles of the present invention, each is depicted here as being formed almost entirely from a flat plate disposed perpendicular to the axis 34 and having an inner ring-like portion 40 provided with an inner cylindrical surface 42 received on, and fixed to the circumference of the cylindrical tubular rotor core 32. Referring now also to FIG. 3, it can be seen that each of the tines 38 includes three points or teeth 44 having respective major sections 46 projecting outwardly from, and respectively joined integrally with, three locations spaced angularly equal amounts about an outer cylindrical surface of the ring-like portion 40. As considered relative to a forward direction of rotation of the rotor 30, each major section 46 includes a leading edge 48 curved arcuately outwardly from the ring-like portion 40. In addition to having the major sections 46 formed from the flat plate, each point 44 includes a flat rectangular strap 50, that is arcuately bent so as to be shaped complementary to the leading edge 48 of each point section 46, is fixed to each leading edge so as to define a smooth leading crop-engaging or working surface 52 that extends axially to opposite sides of the point section 46 and is angled or pitched relative to rotation axis 34. Stated otherwise, the crop-engaging surface 52 of each point 44 of a given rotor tine 38 is angled so as to be other than perpendicular to a vertical plane intersecting the axis 34 at a right angle. A group of three points of adjacent tines, as arranged in the embodiment illustrated in FIG. 2, is shown schematically in FIG. 5 where crop engaged by the leading crop-engaging surface 52 of each point 44 is indicated by a broken line C. The angle which each crop-engaging surface 52 makes with a line extending parallel to the rotor axis 34 is approximately 13° (see FIG. 5). Therefore, the angle the surface 52 makes with a vertical plane intersecting the axis 34 at a right angle is approximately 77°. It is to be understood that crop-engaging surface 52 could be pitched at angles other than 13°. For example, a range of angles between 10° and 25° would also produce suitable results. Further, it is to be understood that instead of making the strap 50 as a part that is separate from the major point sections 46, the tines 38 could be made in the form of castings including points each having a leading rim portion which is wider than the point section and includes a leading crop-engaging surface.

Interleaved with the tines 38 are a plurality of pre-cutter knives 54, one such knife being shown in phantom in FIG. 2 and including a cutting edge 56 that is curved upwardly to the rear from a forward end located behind the rotation axis 34 and below the rotary path traced by the outer ends of the rotor points 44, to a rearward end located alongside the ring-like portion 40 of an adjacent one of the tines 38 and at a height approximately that of the rotation axis 34.

As shown in FIG. 2, beginning with the far or right end of the rotor 30, the second through ninth rotor tines 38 are respectively indexed angularly approximately 8° counter-clockwise about the axis 34 from each other. Thus, it will be appreciated that, during operation, the crop-engaging surface 52 of a given point 44 of the tine 38 on the right end of the rotor 30 will arrive at the cutting edge 56 of an adjacent pre-cutter knife 54 before the crop engaging surface 52 of the indexed point 44 of the tine 38 at the right end of the rotor 30 arrives at the pre-cutter knife 54 adjacent the right end.

Figure 4:
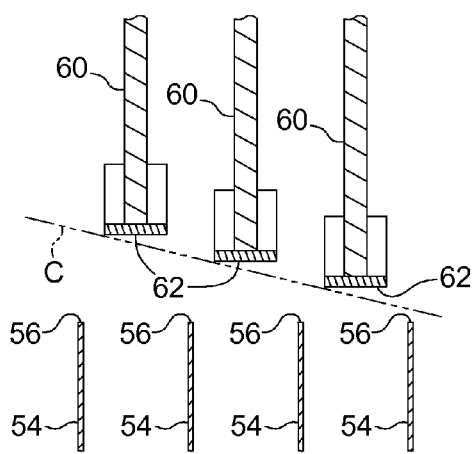
FIG. 4 is a schematic illustration showing rotor points of adjacent prior art tine assemblies and depicting the profile of leading working surfaces of the prior art points just before moving a strand of crop material into engagement with the pre-cutter knives.

FIG. 4 schematically illustrates prior art tine points constructed in accordance with those illustrated in the aforementioned U.S. Pat. No. 8,205,424, with the angularly indexed tine points 60 of adjacent tines including leading, relatively wide crop-engaging surfaces 62 that are disposed parallel to the axis of rotation (not shown) of the rotor carrying the tines. It will be appreciated that as the rotor rotates, the wide profile of the crop engaging surfaces 62 passing on the opposite sides of a given stationary knife 54 creates an uneven surface for supporting the crop, indicated schematically by the chain line C, as it is pressed against the cutting edge 56 of this knife. This results in the cut quality and consistency being less desirable than that achievable with known crop pre-cutter arrangements using narrow profile tines passing between closely spaced pre-cutter knives. An example of a pre-cutter arrangement of this known type is illustrated in FIGS. 1-3 of the aforementioned U.S. Pat. No. 8,205,424.

Figure 5:
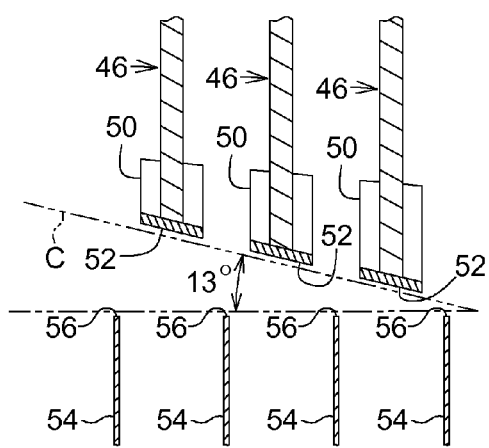
FIG. 5 is a schematic illustration, similar to that of FIG. 4, but showing the profile of leading working surfaces of points of tine assembles constructed in accordance with the present invention.

Referring now to FIG. 5, there is a schematic view similar to that of FIG. 4, but showing the points 44 of the present invention wherein each leading crop-engaging surface 52 is pitched at an angle relative to a line extending parallel to the rotation axis 34. As is apparent, the crop-engaging surfaces 52 of adjacent tines provide an even pair of surfaces for crop C to be held across when being cut by the knife 54 interleaved with the adjacent tines. This results in the cut quality and consistency being comparable to that achieved by the aforementioned pre-cutter arrangements using narrow profile tines passing between closely spaced pre-cutter knives.

Figure 6:
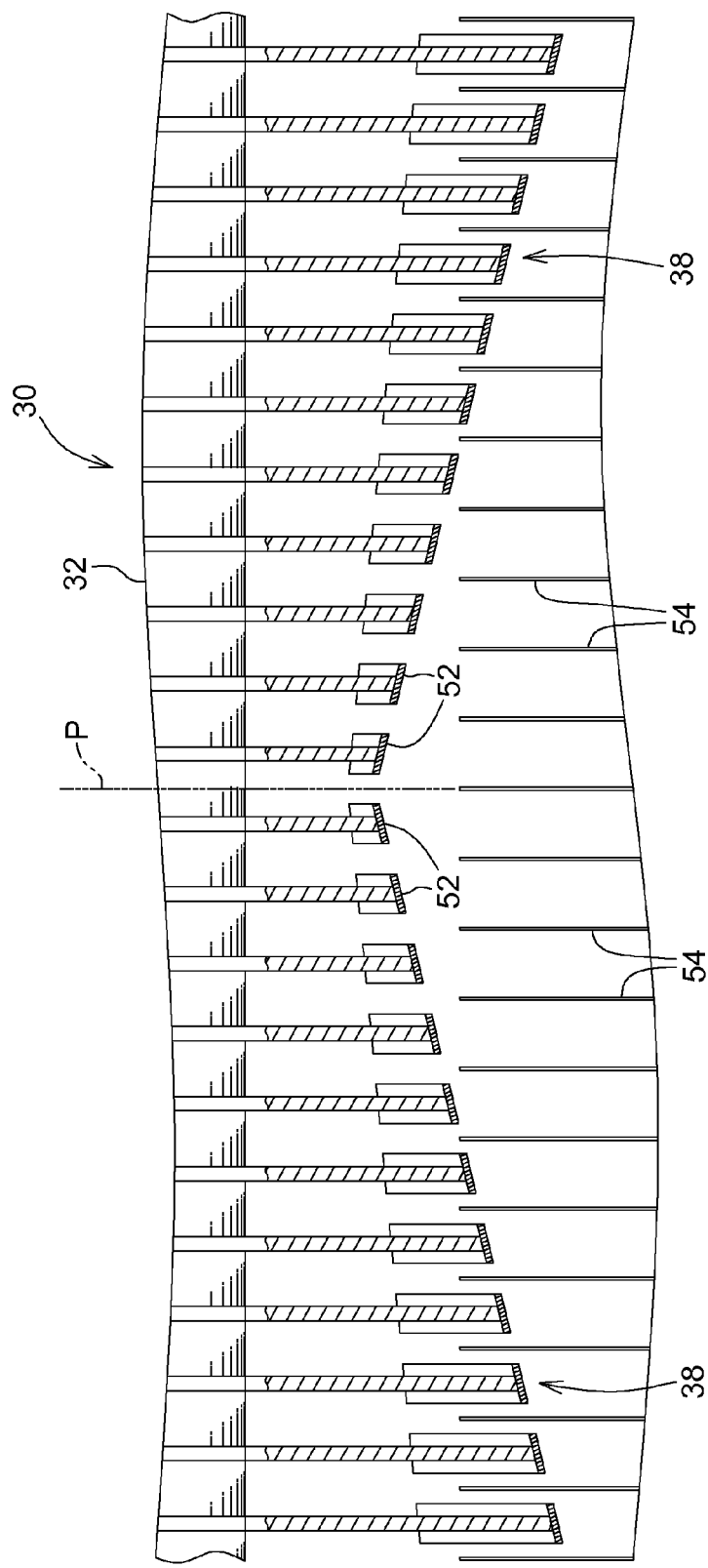
FIG. 6 is a schematic illustration of a rotor equipped with tine assemblies constructed in accordance with the present invention and arranged with the tine assemblies at opposite sides of a vertical central plane extending perpendicular to the pre-cutter rotor being arranged so that the leading surfaces of the points of the tines are angled so as to move crop toward the center location.

Referring now to FIG. 6, a schematic showing of the pre-cutter rotor 30 is illustrated and shows a plurality of tines 38 at opposite sides of a vertical, longitudinal plane P passing through the rotor core 32 at a location midway between opposite ends of the rotor core. As viewed in FIG. 6, the crop-engaging surfaces 52 to the right of the plane P are angled for deflecting crop leftward, while the crop-engaging surfaces 52 to the left of the plane P are angled for deflecting crop rightward. Thus, tines 38 are secured to the core 32 so that crop engaged by the crop-engaging surfaces 52 will be converged inwardly toward the plane P, which would be desirable in some crop processing operations.

Having described the preferred embodiment, it will become apparent that various modifications can be made without departing from the scope of the invention as defined in the accompanying claims.

The invention claimed is:

1. In a pre-cutter rotor including a central longitudinal core having a central rotation axis and having a plurality of crop-engaging points fixed to said core at each of a plurality of longitudinally spaced locations along said rotation axis, with each of said plurality of points extending substantially radially, and with the points of said plurality of points at each of the spaced locations being spaced equal-angularly from each other about said axis, the plurality of points at each of said plurality of spaced locations being indexed equal-angularly about said rotation axis relative to the plurality of points located in an adjacent one of the plurality of spaced locations, and each point, as considered when rotating in a working direction, having a smooth leading working surface joined to a remaining flat portion extending to a trailing surface of the point for engaging crop, the improvement comprising: said smooth leading working surface of each point at each longitudinally spaced location being oriented at an angle relative to a vertical plane making a right angle with said rotation axis at the longitudinally spaced location.

2. The pre-cutter rotor, as defined in claim 1, wherein said angle made by said profile with said associated one of the vertical planes is between ten and twenty-five degrees.

3. The pre-cutter rotor, as defined in claim 1, wherein the leading working surfaces of the points of the tines respectively located at opposite sides of a transverse middle location of the rotor are oppositely angled so as to cause crop engaged at opposite sides of the middle location to be moved toward the middle location.

4. The pre-cutter rotor, as defined in claim 1, wherein the working surface of each point is curved between radially inner and outer ends of the working surface.

5. A pre-cutter rotor, comprising:
a core extending along a rotation axis;
a plurality of crop-engaging points having radially inner end regions mounted to said core at each of a plurality of axially spaced locations along said core, with each of said points extending outwardly relative to said rotation axis;
each point including a crop-engaging leading surface and a trailing surface as considered with respect to a direction of movement of the point when engaging a crop being processed, with the leading and trailing surfaces converging toward an outward end of the point;
the plurality of points at each of the plurality of axially spaced locations are equal-angularly spaced from each other, and the plurality of points, at least at each of an axially consecutive group of the plurality of axially spaced locations, are angularly indexed with respect to the plurality of points at a next adjacent one of the axially spaced locations within said axially consecutive group; and
the crop-engaging leading surface of each of the plurality of points at each of the plurality of axially spaced locations being inclined relative to a plane disposed vertically to the axis of rotation and passing centrally through the plurality of points, with the leading surface diverging from the plane in a direction toward which crop engaging the leading surface would be deflected.

6. The pre-cutter rotor, as defined in claim 5, wherein said leading surface of each of said points is defined by a rim forming a leading region of each of said points and having an axial width greater than an axial thickness of a remaining portion of the point.

7. The pre-cutter rotor, as defined in claim 6, wherein a radially extending flat plate extends around and is fixed to the core at each of said plurality of axially spaced locations; and the remaining portion of each point at each of said plurality of axially spaced locations including an inner region joined to the flat plate, with the remainder of each point and the flat plate at said location having equal axial thicknesses.

\* \* \* \* \*